United States Patent [19]

Strader

[11] 4,371,214
[45] Feb. 1, 1983

[54] BEARING HUB AND CARRIER ASSEMBLY FOR A DRIVEN STEERING WHEEL UNIT

[75] Inventor: Don S. Strader, Lansing, Mich.

[73] Assignee: Motor Wheel Corporation, Lansing, Mich.

[21] Appl. No.: 207,349

[22] Filed: Nov. 17, 1980

[51] Int. Cl.³ .............................................. B60B 35/18
[52] U.S. Cl. .................................. 301/126; 301/132; 180/252; 308/236; 308/DIG. 11
[58] Field of Search ................................ 301/125–126, 301/131–136, 111–113, 122, 121; 180/252; 29/439; 308/DIG. 11, 236, 1 A; 403/355, 377, DIG. 7

[56] References Cited

U.S. PATENT DOCUMENTS

| | | |
|---|---|---|
| 360,663 | 4/1887 | Daniels . |
| 1,899,343 | 2/1933 | Mackey et al. . |
| 2,271,849 | 2/1942 | Wallace ................................ 301/126 |
| 2,539,387 | 1/1951 | Alden . |
| 2,890,073 | 6/1959 | Thomas . |
| 3,268,260 | 8/1966 | Snipe ................................ 403/355 X |
| 3,443,848 | 5/1969 | Philippot et al. ................... 308/236 |
| 3,638,352 | 2/1972 | Christiansen . |
| 3,648,348 | 3/1972 | Freimuth . |
| 3,743,331 | 7/1973 | McNethy ............................ 403/355 |
| 4,039,233 | 8/1977 | Schmidt .......................... 308/236 X |

FOREIGN PATENT DOCUMENTS 235329 6/1925 United Kingdom .

Primary Examiner—Charles A. Marmor
Attorney, Agent, or Firm—Barnes, Kisselle, Raisch, Choate, Whittemore & Hulbert

[57] ABSTRACT

A bearing, hub and carrier assembly for use in a driven steering wheel wherein the drive shaft-engaging spindle on the wheel-mounting hub is locked against axial movement with respect to the spindle-surrounding wheel bearings by a one-piece retaining wire disposed in radially aligned circumferential grooves in the hub spindle and the inner race of the inboard wheel bearing.

6 Claims, 10 Drawing Figures

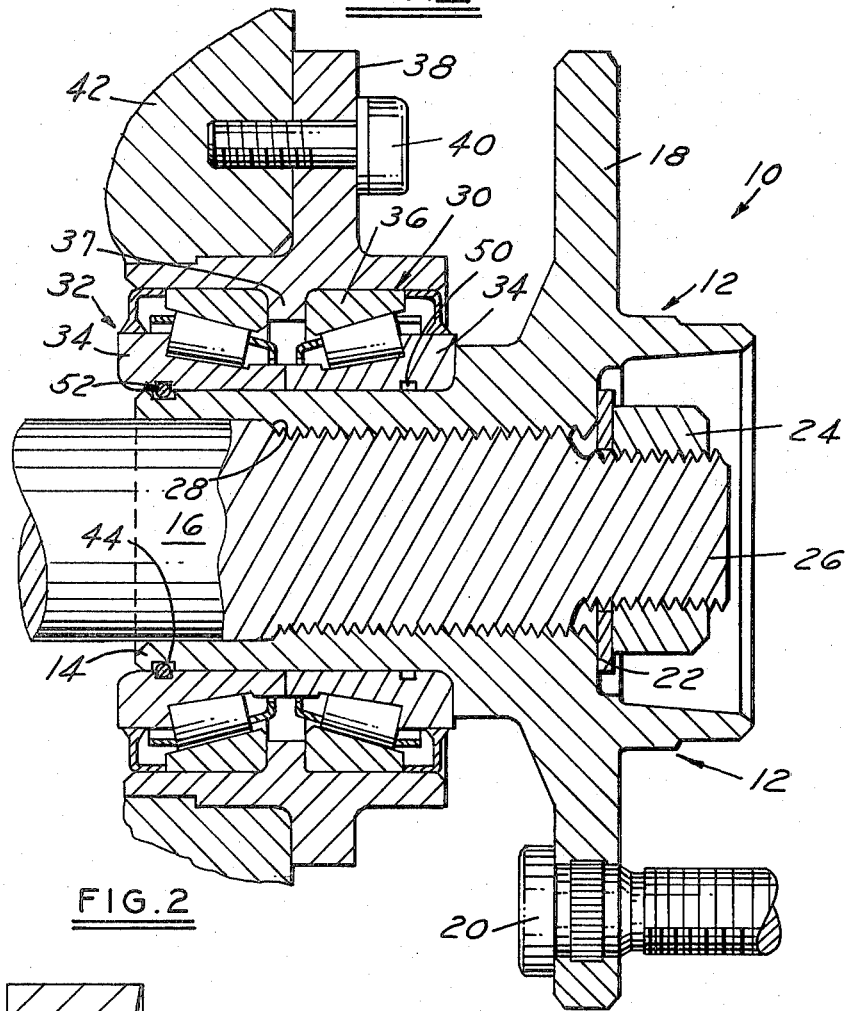
FIG. 1
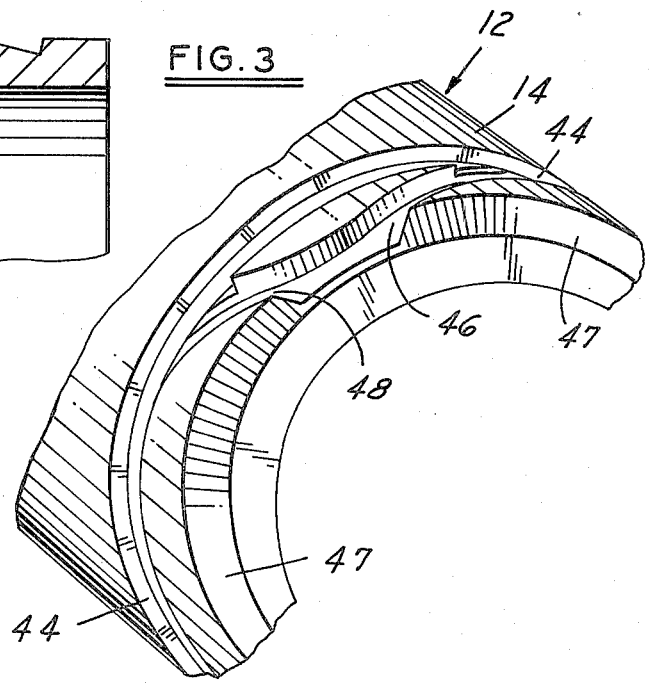
FIG. 2
FIG. 3

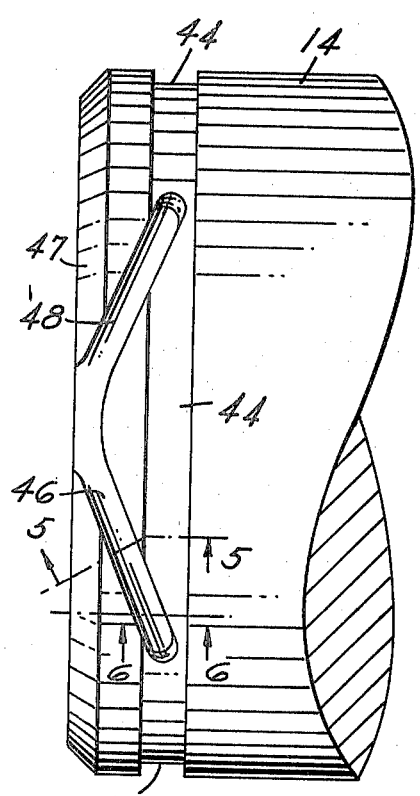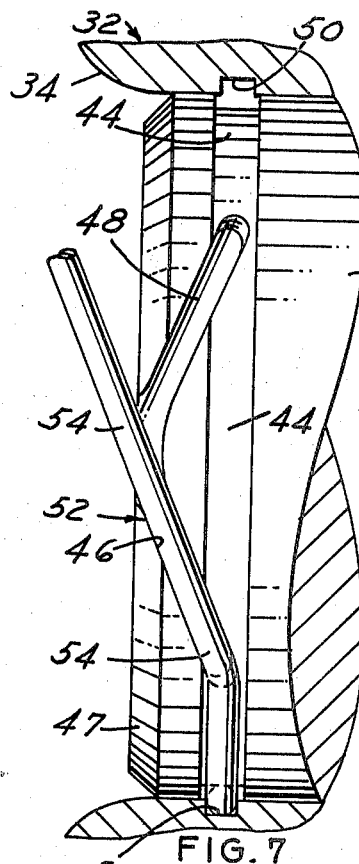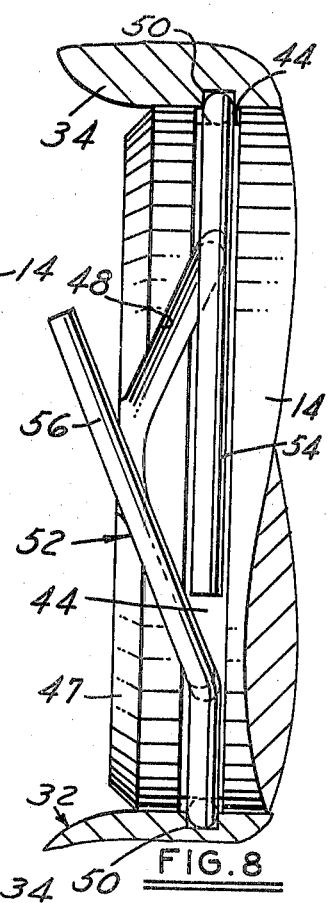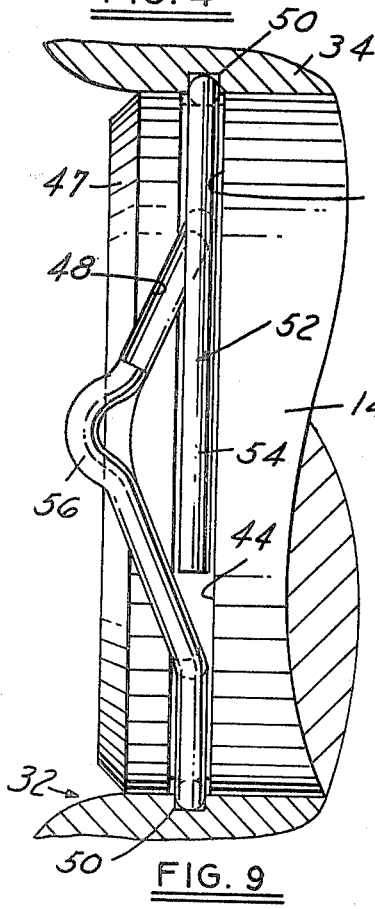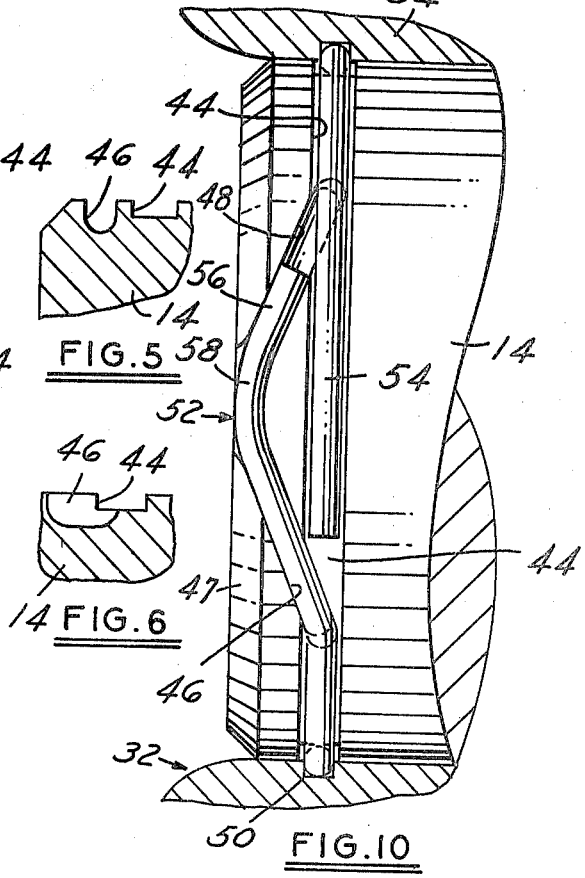

BEARING HUB AND CARRIER ASSEMBLY FOR A DRIVEN STEERING WHEEL UNIT

The present invention relates to wheel mounting units, and particularly to a driven steering wheel unit such as on a front wheel drive vehicle.

In conventional front wheel drive wheel mounting units, a wheel mounting hub has a hollow spindle received over a splined drive shaft and clamped thereon by a nut or the like threaded onto the drive shaft end. In the event of drive shaft fracture immediately inboard of the hub mounting nut, which is the most common mode shaft failure, the wheel mounting hub may become loosened with respect to the drive shaft, and may eventually become completely detached from the shaft and the associated vehicle. It has been proposed in the prior art, such as in the U.S. Patent to Wallace No. 2,271,849, to provide means for locking the wheel mounting hub on the vehicle to prevent detachment in the event of axle failure.

A general object of the present invention is to provide improved structure for locking or retaining the wheel on a driven steering wheel unit, which structure is inexpensive, and may be readily assembled in the factory and disassembled for maintenance or repair in an aftermarket service environment.

The invention, together with additional objects, features, and advantages thereof, will be best understood from the following description, the appended claims and the accompanying drawings in which:

FIG. 1 is a fragmentary radial cross-sectional view along the rotational axis of a front wheel drive wheel mounting unit which includes a bearing hub and carrier assembly in accordance with the invention;

FIG. 2 is a fragmentary sectional view on an enlarged scale of the inboard inner bearing race of the wheel bearing of FIG. 1 as modified for carrying out the invention;

FIG. 3 is a fragmentary end perspective view of a wheel hub spindle in accordance with the invention;

FIG. 4 is a fragmentary top plan view of the wheel spindle end as shown in FIG. 3;

FIGS. 5 and 6 are sectional views taken respectively along the lines 5—5 and 6—6 in FIG. 4; and FIGS. 7-10 are fragmentary top plan views similar to FIG. 4 showing the invention at successive stages of assembly.

FIG. 1 illustrates a front wheel drive wheel mounting or unit 10 as comprising a hub 12 having a hollow spindle 14 telescopically received over a splined drive shaft 16, and a flange 18 radiating from an outboard end of spindle 16. (It will be appreciated that directional adjectives such as "inboard" and "outboard" are taken with reference to preferred orientation with respect to a vehicle.) A plurality of bolts 20 are distributed in a circular array around flange 18 for mounting thereto a disc or drum-type brake rotor and a vehicle wheel (not shown). Hub 12 is retained on drive shaft 16 by a washer 22 and a nut 24 received over a threaded end 26 of shaft 16 and clamping hub 12 against an opposing conical shoulder 28 on shaft 16. Shaft 16 is typically connected to the engine through a constant velocity universal joint drive line (not shown).

A pair of tapered roller bearings 30,32 have inner races 34 telescopically press-fitted over spindle 14. The outer races 36 of bearings 30,32 are press-fitted within and carried by a cup carrier 38, the respective outer races being abutted against and separated by a shoulder 37 on carrier 38. Carrier 38 is mounted by a bolt 40 to a steering knuckle 42 which, in turn, is rotatably mounted by means not shown to the vehicle. The wheel unit 10 thus far described in connection with FIG. 1 is generally conventional. In the event of fracture of drive shaft 16 immediately inboard of nut 24 and washer 22, lateral forces on the vehicle wheel during continued operation may eventually loosen hub spindle 14 with respect to inner bearing races 34, such that the hub and vehicle wheel may eventually be detached from the vehicle. To prevent such an occurrence, locking structure is provided in accordance with the present invention for retaining wheel hub 12 on the vehicle in event of axle failure as described.

Referring to FIGS. 1-6, such locking structure comprises a first circumferential groove 44 of rectangular cross-sectional configuration formed in the outer surface of hub spindle 14 adjacent the inboard end thereof remote from wheel mounting flange 18. A feed groove 46 is formed on the outer surface of hub spindle 14 at an acute angle intersecting circumferential groove 44 and opening at the flange-remote end of spindle 14 on an external end chamfer 47, as best seen in FIG. 3. A locking groove 48 is likewise formed on the outer surface of spindle 14 intersecting feed groove 46 at chamfer 47 and extending at an obtuse angle with respect to feed groove 46 toward, and preferably intersecting, groove 44 at a point circumferentially spaced from the intersections of grooves 44 and 46, as best seen in FIGS. 3 and 4. An internal circumferential groove 50 (FIG. 2) is likewise formed in the inner race 34 of inboard wheel bearing 32 at a position adapted in assembly (FIG. 1) for radial alignment and registry with circumferential groove 44 in spindle 14. Preferably a similar groove 50 is also formed in the inner race 34 of outboard wheel bearing 30 so that the wheel bearings are interchangeable in assembly.

A retaining wire 52 of circular cross-section is received in aligned circumferential grooves 44,50 in spindle 14 and wheel bearing 32. The inner portion 54 of wire 52 substantially encircles spindle 14 in groove 44, as best seen in FIG. 10 to provide a substantially complete single-turn wrap retaining ring in the groove. The outer end 56 of wire 52 extends from groove 44 through feed groove 46 and then terminates in locking groove 48. As will be best appreciated with reference to FIGS. 9-10, the diameter of wire 52 is greater than the radial dimension of either of the circumferential grooves 44,50, and is slightly less than the combined radial dimension of these circumferential grooves, when registered in alignment. Wire 52 thus effectively prevents more than slight axial displacement of the aligned circumferential grooves out of radial registry. The radial dimension of feed groove 46 (as best seen in FIGS. 5 and 6) and of locking groove 48 is slightly greater than the diameter of wire 52 so that the wire may be fed therethrough as will be described without any requirement for corresponding grooves formed in wheel bearing race 34.

As will be best appreciated with respect to FIGS. 1 and 7-10, the dimension of circumferential groove 44 in spindle 14 measured in a direction axially of the spindle is greater than, and preferably about 50% greater than, the corresponding dimension of circumferential groove 50 in bearing race 34. In accordance with the invention, in the event of loss of nut 24 from failure of shaft 16 or otherwise, this disparity in groove axial dimensions permits limited axial movement of spindle 14 and hub 12 with reference to bearing 32 and cup carrier 38. Such limited movement will produce an audible rattling noise which, when heard by an operator, warns that nut 24 has become loosened or removed, or that the drive shaft has failed as previously described and must be replaced. However, substantial axial movement of hub 12 with reference to the vehicle, is prevented by the locking wire 53 in cooperation with inboard bearing 32, shoulder 37 and cup carrier 38. In a working embodiment of the invention wherein wire 52 has a diameter of 0.794 mm, groove 44 has a radial depth of 0.406 to 0.457 mm and groove 50 has a radial depth of 0.457 to 0.559 mm. Groove 44 has an axial dimension of 1.422 to 1.549 mm, while groove 50 has an axial dimension of 0.914 to 1.041 mm. Grooves 46,48 have a depth of 0.813 to 0.914 mm and a width of 1.016 to 1.143 mm.

In assembly, and as best appreciated by considering FIGS. 7–10 in succession, cup carrier 38 and wheel bearings 30,32 are first assembled onto hub 12 as previously described such that circumferential grooves 44,50 in inboard wheel bearing 32 and hub spindle 14 are in radial registry (FIG. 7). The inner end portion 54 of locking wire 52 is then fed by hand through feed groove 46 (FIG. 7), and then into aligned grooves 44,50 so as to surround entirely spindle 14 (FIG. 8). Wire 52 is preferably made of music wire material so as to be sufficiently yieldable or flexible progressively to deform and reform to accommodate the angular transition from groove feed groove 46 into grooves 44,50. Outer free end 56 of wire 52 is then bent (FIG. 9) and fed into locking groove 48 (FIG. 10). In this configuration, with wire end 56 locked in groove 48, circumferential movement of wire 52 with respect to spindle 14 and bearing race 34 is prevented. Furthermore, that portion 58 (FIG. 10) of wire 52 extending between grooves 46,48 at chamfer 47 is readily accessible for disassembly in the reverse order, i.e. the order of the steps illustrated in FIGS. 10, 9, 8 and 7 successively. It will be appreciated that locking groove 48 in the preferred embodiment shown in the drawings, is identical to feed groove 46 so that the two are effectively interchangeable in assembly.

The invention claimed is:

1. For use in a driven steering wheel unit as in a front wheel drive vehicle, a bearing hub and carrier assembly comprising a hub including an internally splined spindle adapted to receive a splined drive shaft and an integral flange radiating from one end of said spindle for mounting of a vehicle wheel, at least one bearing means having an inner race telescopically received over said spindle and an outer race, a cup carrier mounted to said outer race externally of said spindle for mounting said assembly to a vehicle and means for locking said hub against axial removal with respect to said bearing means and said cup carrier, said locking means comprising a first circumferential groove formed on said spindle adjacent the flange-remote end thereof, a second circumferential groove formed in said inner race in radial alignment with said first circumferential groove, a third groove on said spindle at an intersecting acute angle with respect to said first groove and opening at said flange-remote end of said spindle, a fourth groove formed in the outer spindle surface at an angle intersecting said third groove at said flange-remote end of said spindle, and a one-piece retaining wire received in said aligned first and second grooves surrounding said spindle for preventing axial displacement of said first and second grooves out of radial registry, an end of said wire extending through said third groove which functions as a wire feed groove and then into said fourth groove which functions as a locking groove for locking said wire against rotation with respect to said spindle and affording access to said wire at the intersection of said feed and locking grooves for removing said wire in disassembly.

2. The invention set forth in claim 1 wherein said feed groove has a radial dimension greater than said wire diameter.

3. The invention set forth in claim 2 wherein said locking groove has a radial dimension greater than the diameter wire diameter.

4. The invention set forth in claim 3 wherein said locking groove and said feed groove are of identical dimension and intersected by said first circumferential groove at circumferentially spaced points, such that said feed and locking grooves are functionally interchangeable.

5. The invention set forth in claim 3, 4 or 1 wherein said first circumferential groove has a dimension axially of said spindle greater than the corresponding dimension of said second circumferential groove for permitting limited axial movement of said spindle with respect to said wheel bearing means.

6. The invention set forth in claim 5 wherein said first and second circumferential grooves are rectangular in cross sectional configuration.

* * * * *